United States Patent
Griffin, Jr.

(10) Patent No.: US 7,835,809 B2
(45) Date of Patent: Nov. 16, 2010

(54) DIGITAL MEDIA PLAYER ACCESSORY INTERFACE

(75) Inventor: Paul P. Griffin, Jr., Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 630 days.

(21) Appl. No.: 11/788,498

(22) Filed: Apr. 20, 2007

(65) Prior Publication Data

US 2007/0198112 A1    Aug. 23, 2007

Related U.S. Application Data

(63) Continuation-in-part of application No. 11/286,610, filed on Nov. 23, 2005.

(51) Int. Cl.
*G06F 17/00* (2006.01)
(52) U.S. Cl. .................. 700/94; 710/303; 710/304
(58) Field of Classification Search ............. 700/94
See application file for complete search history.

(56) References Cited

U.S. PATENT DOCUMENTS

| | | | |
|---|---|---|---|
| 6,374,148 B1 * | 4/2002 | Dharmarajan et al. ........ | 700/94 |
| 6,993,615 B2 * | 1/2006 | Falcon ....................... | 710/303 |
| 7,259,793 B2 * | 8/2007 | Manico et al. ............... | 348/373 |
| 7,441,058 B1 * | 10/2008 | Bolton et al. ................ | 710/105 |
| 2002/0155864 A1 * | 10/2002 | Wang ........................ | 455/566 |
| 2003/0021087 A1 * | 1/2003 | Lunsford ..................... | 361/686 |
| 2003/0073432 A1 * | 4/2003 | Meade, II .................... | 455/420 |
| 2003/0220988 A1 * | 11/2003 | Hymel ....................... | 709/220 |
| 2004/0081099 A1 * | 4/2004 | Patterson et al. ............. | 370/241 |
| 2005/0280550 A1 * | 12/2005 | Kurian et al. .......... | 340/815.45 |
| 2006/0105722 A1 * | 5/2006 | Kumar ...................... | 455/90.3 |
| 2007/0093264 A1 * | 4/2007 | Srinivasan et al. ........ | 455/556.1 |
| 2007/0093277 A1 * | 4/2007 | Cavacuiti et al. ............ | 455/566 |
| 2007/0291954 A1 * | 12/2007 | Neu et al. .................... | 381/77 |
| 2010/0031145 A1 * | 2/2010 | Haggis et al. ............... | 715/716 |

OTHER PUBLICATIONS itrip_man; Griffin Technologies; c2004.*
itrip_2; Griffin Technologies; c2004.*

* cited by examiner

*Primary Examiner*—Curtis Kuntz
*Assistant Examiner*—Paul McCord
(74) *Attorney, Agent, or Firm*—Hornkohl Intellectual Property Law, PLLC; Jason L. Hornkohl

(57) ABSTRACT

An accessory for an electronic device detects manipulation of a user input of the device and alters an operating parameter of the accessory in response to the detected manipulation of the device's controls. The accessory is preferably an FM transmitter designed to be coupled to a portable media player such that an audio signal from the player is broadcast by the accessory. The user controls of the player can be used to select a transmission frequency of the accessory. The accessory can also preferably control the display of the device such that an image corresponding to the selected transmission frequency is generated by the accessory and displayed on a screen of the player.

17 Claims, 8 Drawing Sheets

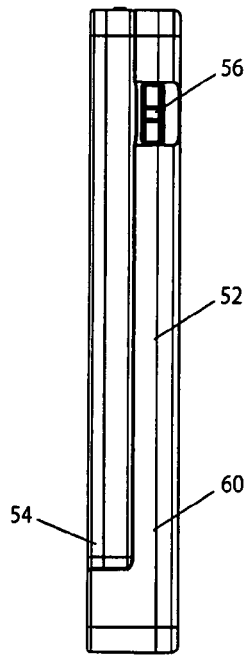 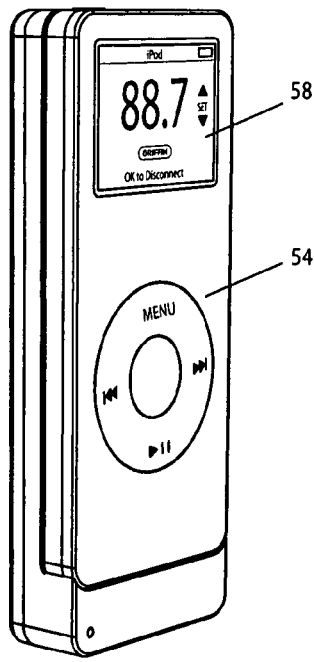 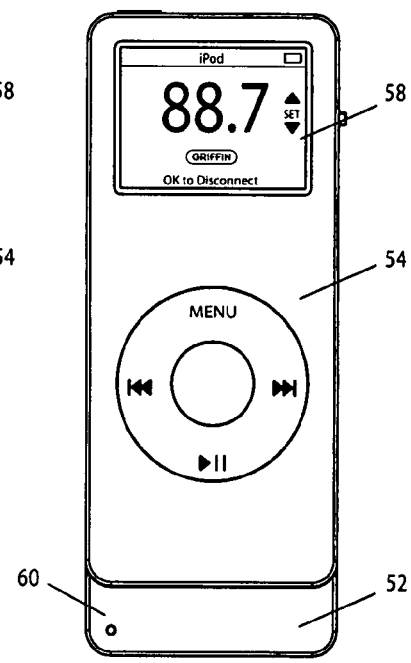
FIG. 3(a)  FIG. 3(b)  FIG. 3(c)
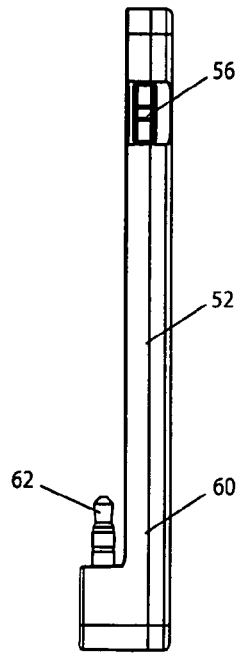 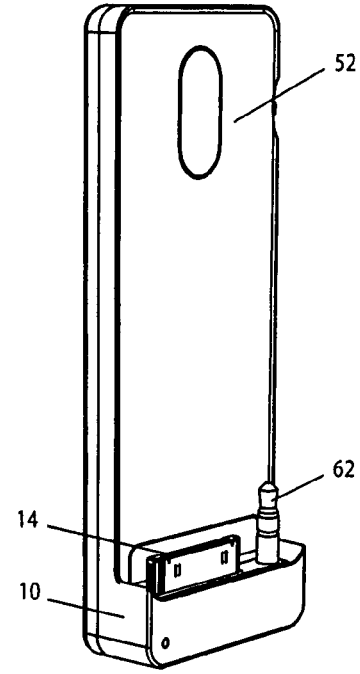 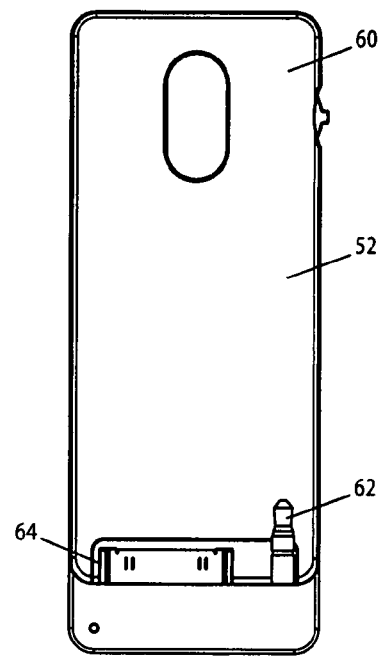
FIG. 4(a)  FIG. 4(b)  FIG. 4(c)

DIGITAL MEDIA PLAYER ACCESSORY INTERFACE

CROSS-REFERENCES TO RELATED APPLICATIONS

This application is continuation-in-part of U.S. patent application Ser. No. 11/286,610 filed Nov. 23, 2005, which is hereby incorporated by reference, for an "IMPROVED DIGITAL MUSIC PLAYER ACCESSORY INTERFACE" for the invention by Paul P. Griffin, Jr.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Digital media players such as the Apple iPod™ are known which allow a user to receive an XM, FM or AM radio transmission. Typically, the user uses the controls of the media player to select the frequency of the station which the user desires to listen to. The selected frequency is then displayed on a display screen of the device. Unfortunately, these portable media players typically do not have a radio transmitter that allows a digital media file being played on the media player to be transmitted to a remote radio receiver such as a car stereo.

FM transmitter accessories have also been developed that can be coupled to a portable media player and used to transmit audio signals from the portable media player to a remote radio receiver on a television or stereo. These devices typically have a set of controls that allow a user to select a transmission frequency for the transmitter and an LED display screen that displays the selected transmission frequency. Unfortunately, these displays and controls add to the cost of the transmitting accessory. In addition, they add to the size and complexity of the accessory. This is undesirable in that it makes the accessory unwieldy to use while coupled to the portable media player, increases the power required by the accessory and makes the accessory more prone to failure due to the increased number of components.

BRIEF SUMMARY OF THE INVENTION

An embodiment of the present invention is directed toward an accessory for coupling with an electronic device having at least one device control user input for controlling a function of the device. The accessory includes an input port for receiving a device control signal indicative of a user's manipulation of the user input of the device. Conversion circuitry or software converts the device control signal into an accessory control input such that the device control user input can be used to control a function of the accessory. Preferably, the device is a media player, the accessory is a transmitter, the device control user input is a volume control for the media player and the conversion circuitry or software converts the volume control signal to a transmitter power output control signal. In addition, the device preferably has control user inputs that control a reception frequency of a receiver of the device and a transmission frequency of a transmitter in the accessory, a mono or stereo reception mode of the device and a mono or stereo transmission mode of the accessory, and select a set of regional preferences such that the accessory implements a corresponding set of regional preferences in response to the preferences selected with the device control user inputs. An automatic turn off signal of the device is repurposed to also cause the accessory to automatically turn off. The accessory selectively controls the display of the device such that it can display images or menus on the device's display. The accessory is also preferably a parasitic device that obtains power from the media player.

Another embodiment of the present invention is directed toward an accessory for use with a digital media player wherein the digital media player includes a display screen and a set of user controls. The accessory includes repurposing circuitry or software for detecting manipulation of at least some of the user controls and producing control signals for a functionality of the accessory based upon the detected manipulation of the user controls. The accessory also preferably includes display circuitry or software for generating image files for display on the digital media player's display. The display circuitry or software generates a new image file for transmission to the digital music player when the user controls on the digital media player are manipulated to reflect the change in the accessory's configuration. The digital media player is also preferably portable and the accessory receives power from a power supply of the portable digital media player. The accessory has a housing configured to physically couple to the housing of the digital media player. The accessory preferably includes a transmitter and the device user controls control a transmission frequency of the accessory's transmitter.

Yet another embodiment of the present invention is directed toward a method of coupling an accessory to a portable electronic device. In accordance with the method, manipulation of a user input of the portable electronic device is detected and an operating parameter of the accessory is altered in response to the detected manipulation of the device's controls. Preferably, the accessory is an FM transmitter designed to be coupled to the portable electronic device such that an audio signal from the portable electronic device is broadcast by the accessory and the user controls of the portable electronic device can be used to select a transmission frequency of the accessory. An image corresponding to a menu having a number of user selections is generated with the accessory and the menu image is transferred to the portable electronic device. The menu image is displayed on a display screen of the portable electronic device and a user input on the portable electronic device is monitored to determine which of the user selections is selected by the user. Power is provided from the portable electronic device to the accessory to power the accessory. The accessory is adapted to be physically and electrically coupled to the portable electronic device. Preferably, the portable electronic device is a digital media player.

BRIEF DESCRIPTION OF THE SEVERAL VIEWS OF THE DRAWINGS

FIGS. 3(a-c) are illustrations of an embodiment of the present invention coupled to a digital media player;

FIGS. 4(*a-c*) are illustrations the embodiment of FIGS. 3(*a-c*) decoupled from the digital media player.

DETAILED DESCRIPTION OF THE INVENTION

The present invention is directed toward a device and method for converting or repurposing the controls and/or display of a portable media player to control an accessory coupled to the player and display menus for selecting functions of the accessory. For example, an FM receiver tuning interface for a portable media player (e.g., the Apple Computer iPod™) can be used to configure and control an external FM transmitter on an accessory communicatively coupled to the media player. The tuning commands for the portable media player are transmitted externally over a serial bus to the accessory. An embodiment of the present invention repurposes those signals such that the user can control the accessory by using the controls of the player. Thus, the user can select a transmission frequency for an FM transmitting accessory using the FM receiver controls of the portable media player. In addition, the accessory can use the display of the media player to display the selected frequency for the transmitting accessory. While the above example is directed toward repurposing FM receiver controls to function as FM transmitter controls and using the display to display the selected frequency, the present invention can be used to convert or repurpose any type of device controls and display into an accessory display and controls.

Figure 1:
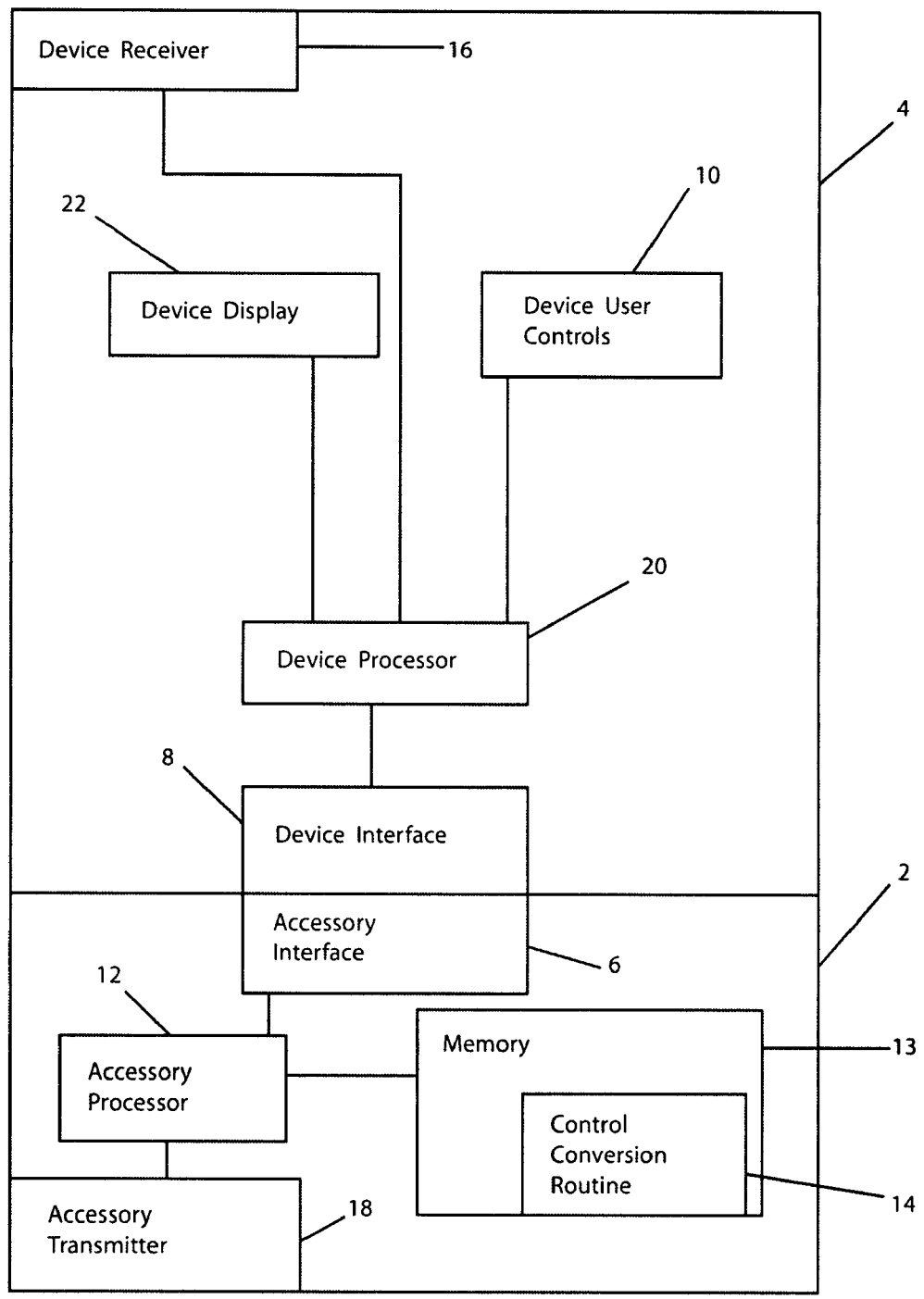
FIG. 1 is a functional block diagram of an accessory constructed in accordance with an embodiment of the present invention coupled to a portable media player.

Referring now to FIG. 1, a functional block diagram of an accessory 2 constructed in accordance with an embodiment of the present invention coupled to a portable media player 4 is shown. The accessory 2 is coupled to the device 4 through an accessory interface 6 and a device interface 8. The interfaces 6 and 8 may be physically coupled through an electrical connection or communicatively coupled through a wireless connection. In either case, the accessory interface 6 has the ability to detect when a set of user controls 10 for the portable media player device are activated. The device 4 has a device processor 20 that interprets manipulation of its user inputs 10 into controls for a device component or function such as the device receiver 16. External access to this device control data is typically provided through the device interface 8. The accessory 2 has an accessory processor 12 that converts the detected device control inputs 10 into accessory control inputs using a control conversion routine 14 stored in a memory 13. The control conversion routine 14 receives a device control input from the device 4 and outputs an accessory control for the accessory 2. For example, if the device 4 detects that the device's receiver 16 has been set to receive an FM frequency of 99.7 KHz, the control conversion routine 14 produces an accessory control output that sets the accessory's transmitter 16 to a transmission frequency 99.7 KHz. In such a case, the display 22 of the device 4 will typically be displaying the device's receiver 14 frequency which is now also the accessory's transmitter's 16 frequency. Alternatively, the accessory 2 can create a display file to be displayed on the device's display 22 as discussed in more detail below. Thus, the display 22 of the device 4 also functions as the display of the accessory 2. The control conversion routine 14 can be implemented through hardware or software depending upon the number and complexity of control conversions desired.

Figure 2:
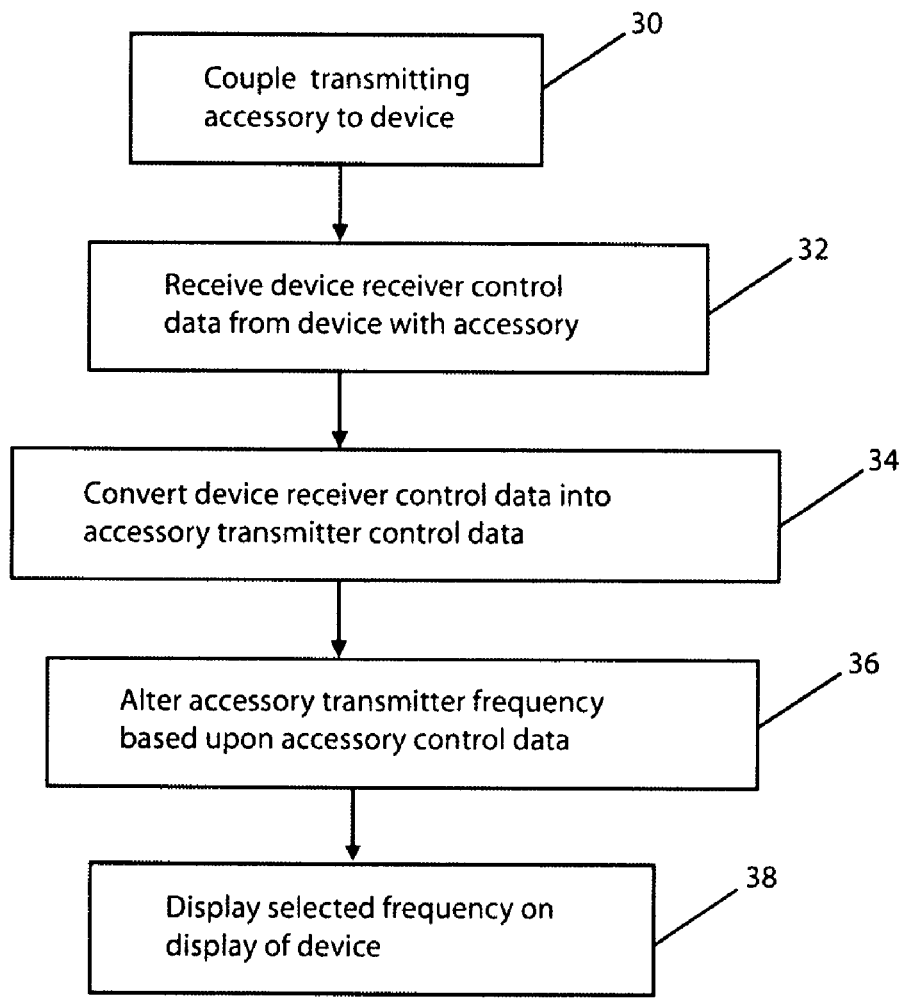
FIG. 2 is a flow chart of a method of controlling an accessory for a portable media player in accordance with an embodiment of the present invention.

Referring now to FIG. 2, a flowchart of a method of repurposing the controls of an electronic device to control an accessory for the device is shown. The method begins in step 30 with the coupling of the accessory to the device. The accessory can be physically or wirelessly coupled to the accessory as long as the accessory can detect manipulation of at least some of the controls of the device. The method then proceeds to step 32 wherein the accessory receives device receiver control data from the device. In step 34, the accessory coverts or repurposes the receiver control data into accessory transmitter control data. Then, in step 36, the accessory alters its transmitter frequency based upon the accessory control data. In step 38, the selected frequency is displayed on the device's display. This can be accomplished in one of two ways. First, the device may simply display the selected receiver frequency which corresponds to the frequency of the accessory's transmitter. Alternatively, if a different type of device control such as a volume control is used to select the transmission frequency of the accessory's transmitter, the accessory can send display control data to the device that repurposes the device display to display the selected transmission frequency.

While the flow chart of FIG. 2 is directed toward a method of repurposing the device's receiver controls, any type of control signals can be repurposed in accordance with embodiments of the present invention. For example, the tuning controls of the device can be repurposed to control the tuning band/range of an accessory's transmitter to enable geographic localization of the transmitter's band/range or pre-emphasis settings for different geographic areas such as Japan, the European Union and the United States. The device's volume control can be also used to control the output level of the accessory's transmitter. When the volume output is adjusted through the device's interface, the accessory attenuates the audio out of the line out connector so that the volume level of the line out moves up or down at the same rate as the device's headphone jack does. For example, if the media player is set to 100% volume, the accessory will provide the full line-out signal out to the transmitter. If the user changes the player volume to 50%, the accessory senses this change and attenuates the line out to match the output level of the headphone jack. As yet another example, the seekup and seekdown device receiver frequency controls can be repurposed to control a seekup and seekdown function for the accessory transmitter. Similarly, the mono/stereo reception control of the device receiver can control the mono/stereo transmitter transmission modes. As yet further examples, the presets on the device receiver can function as presets for the accessory transmitter and the device's On/Sleep/Off commands can place the accessory into corresponding modes.

It is important to note that the controls of the device may be repurposed for other entirely different accessory controls. A single control may cause several device changes to occur, e.g., altering a regional control setting may alter the accessory's transmitter's frequency range, power, and pre-emphasis. In such situations, the controls are repurposed through macros stored in the accessory that convert the device control into the desired combination of accessory setting. Those skilled in the art will appreciate, in light of the present disclosure, that the any accessible controls of the device can be used to control any desired function of the accessory.

A preferred embodiment of the present invention can also use the display screen of the attached electronic device to display images received from the accessory. The device controls can be repurposed to control the images produced by the accessory and displayed on the screen of the device. For example, the high resolution LCD on a portable media player, i.e. an Apple iPod™, can be used to display dynamic information and images sent to it by an accessory such as an FM transmitter. An accessory constructed in accordance with an embodiment of the present invention receives inputs from a device user interface and then writes changes in the accessories configuration to the digital music player screen such that accessory can utilize both the screen and controls of the device to which it is coupled. This decreases the cost and complexity of the accessory, thereby making it much more economically attractive and reliable. Thus, the present invention represents a substantial improvement upon the prior art.

Referring now to FIGS. 3(a-c) and FIGS. 4(a-c), side (a), perspective (b) and frontal view (c) illustrations of an embodiment of the present invention coupled to, and uncoupled from, an iPod Nano™ are shown. The accessory 52 is an FM transmitter that is designed to mate with a digital music player 54 such that an audio signal received by the accessory 52 from the digital music player 54 can be broadcast to an external FM receiver such as a car radio or home radio. The accessory 52 preferably has sled shaped housing 60 that is designed to be coupled with the digital music player such that the accessory and the digital music player function, and can be carried, as a single unit. In the preferred embodiment shown in FIGS. 3 and 4, the iPod Nano™ slides into the iTrip™ accessory and securely connects to the iPod via the iPod's dock and headphone connectors. The iTrip™ accomplishes all this without adding bulk to the slim iPod Nano™.

A user can preferably use the controls of the player 54 to control the accessory as described herein above. However, a user input 56 such as a three position toggle switch 56 may be provided on the accessory 52 to allow a user to directly select an FM frequency on which to broadcast the audio signal received from the digital music player 54 if desired. The toggle switch 56 also allows the user to manipulate menus displayed on a video screen 58 of the digital music player 54 that is coupled to the FM transmitting accessory 52. By selecting the proper menus, digital music player functions, such as the volume, operating mode, display, etc., can be controlled through manipulation of the toggle switch 56 by repurposing the accessory's controls to control the player's functions. While a toggle switch 56 is shown on the embodiment of FIGS. 3 and 4, it will be readily appreciated by those skilled in the art that any suitable user interface 56 could be used. In the embodiment shown, an USB connector 62 and 30 pin connector 64 are used to electrically and physically couple the accessory 52 to the digital music player 54. However, it will also be readily appreciated by those skilled in the art that the connectors 62 and 64 on the accessory 52 may be altered to accommodate the connectors on the digital media player 54.

In the embodiment shown in FIGS. 3 and 4, the digital music player 54 is configured to receive a static data file such as a bit map from the accessory 52 that is then stored in an image memory of the digital music player 54 and displayed on the player's screen 58. The digital music player 54 is often only configured to display static information received from the accessory 52. However, an accessory 52 constructed in accordance with an embodiment of the present invention has a microprocessor and memory or data storage capacity that allow it to generate new data files based upon a user's manipulation of the toggle switch 56. The accessory then sends a signal to the digital music player 54 that instructs the digital music player 54 to substitute the newly generated static data file for the previously transmitted data file. Thus, the accessory 52 can generate a display file that indicates the currently selected transmitter frequency and transmit the data file to the digital music player 54 such that the data file is shown on the display screen of the digital music player 58. In addition, the accessory can generate files that display menus on the screen on the digital music player and allow a user to manipulate the menus through the use of the toggle switch 56 or the controls of the player 54 as described herein above.

The accessory can generate image files based upon stored partial image files or simply retrieve complete images from memory or a combination of both. For example, the accessory could generate a "98.5" by retrieving stored files corresponding to "9", "8" and "5" and building a composite image file that corresponds to "98.5". Such a system is beneficial in that it reduces the memory requirements of the accessory. Alternatively, the accessory could simply retrieve an image file corresponding to "98.5", thereby marginally increasing the memory requirements, but decreasing the processing requirements of the accessory.

Figure 5:
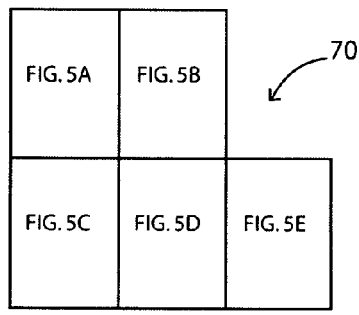
FIG. 5 is a schematic diagram of an embodiment of the present invention.
Figure 5A:
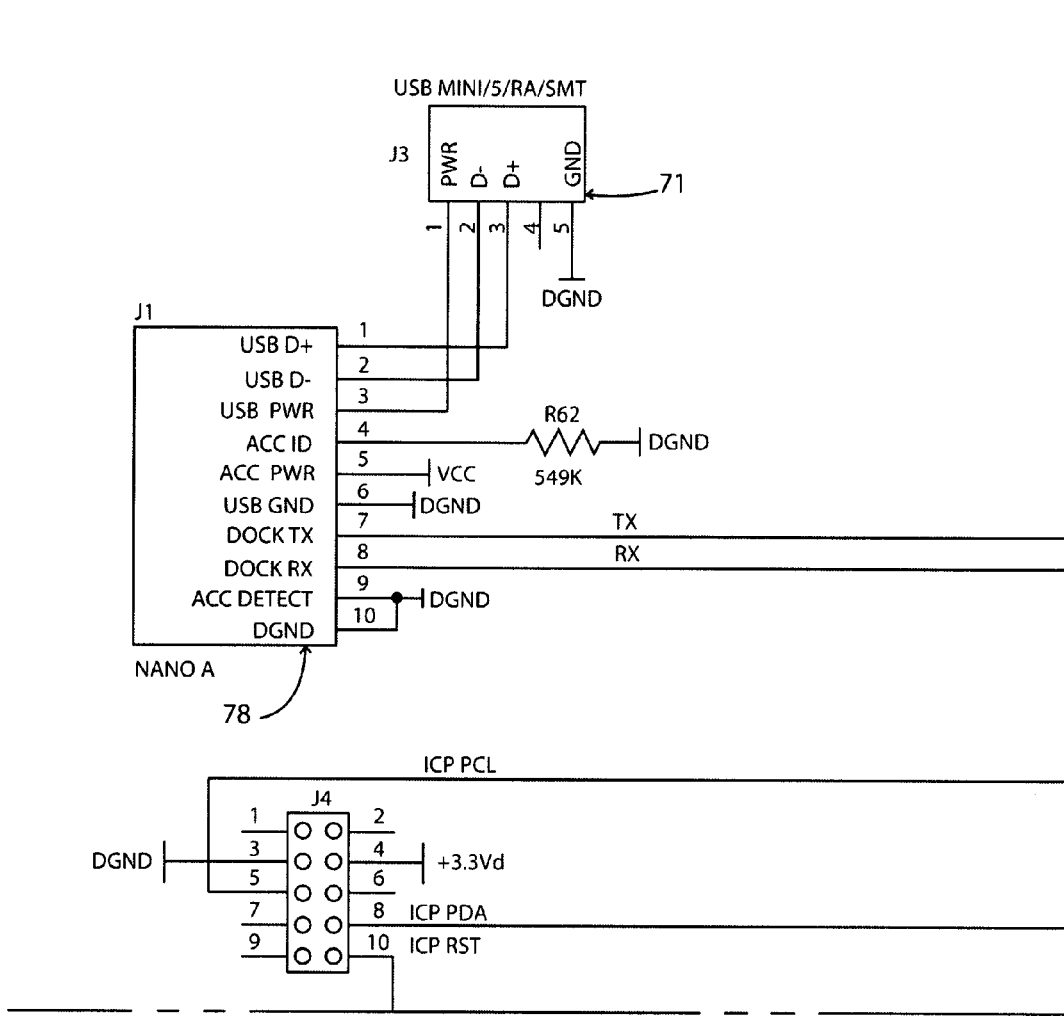
Figure 5B:
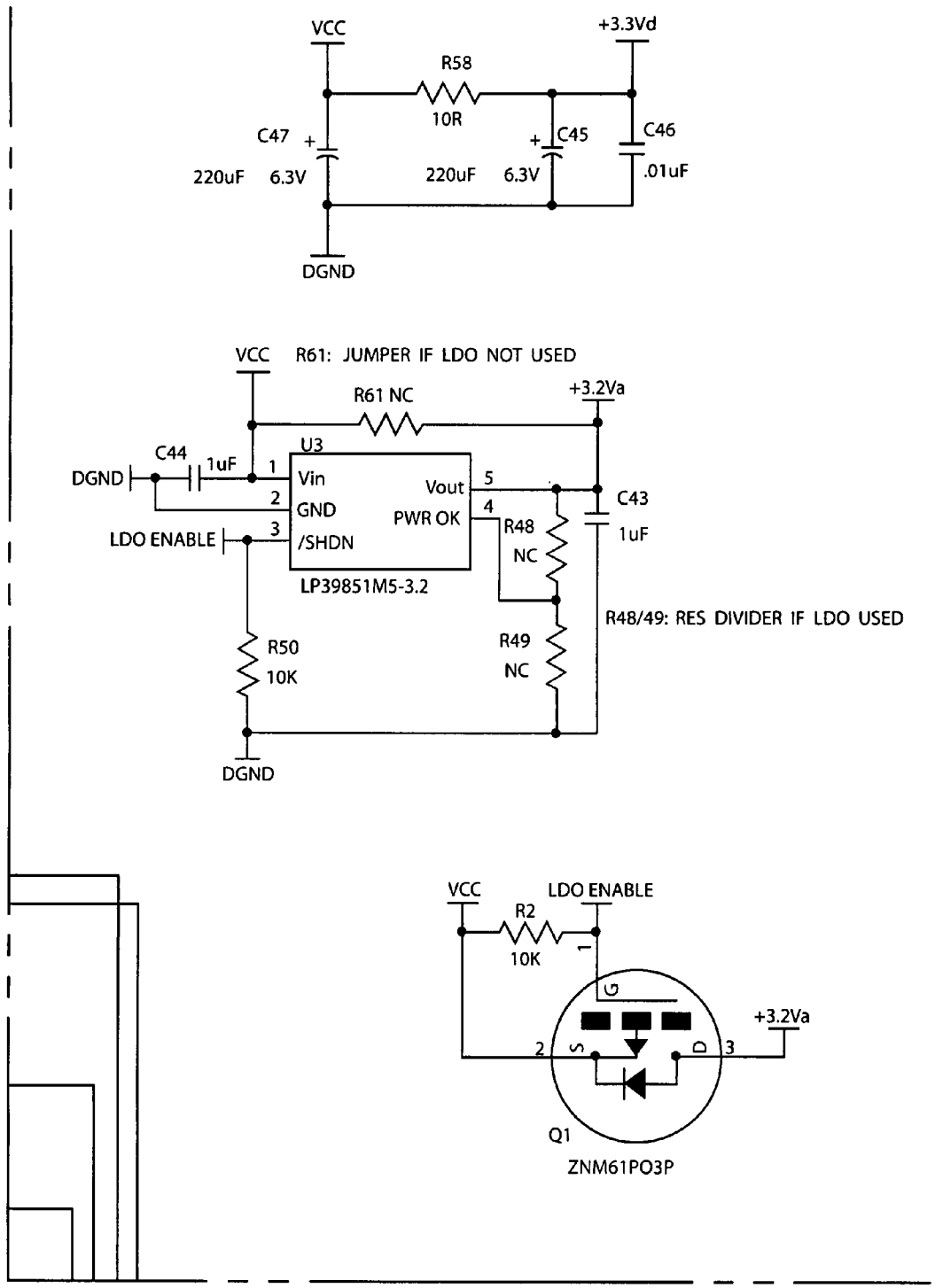
Figure 5C:
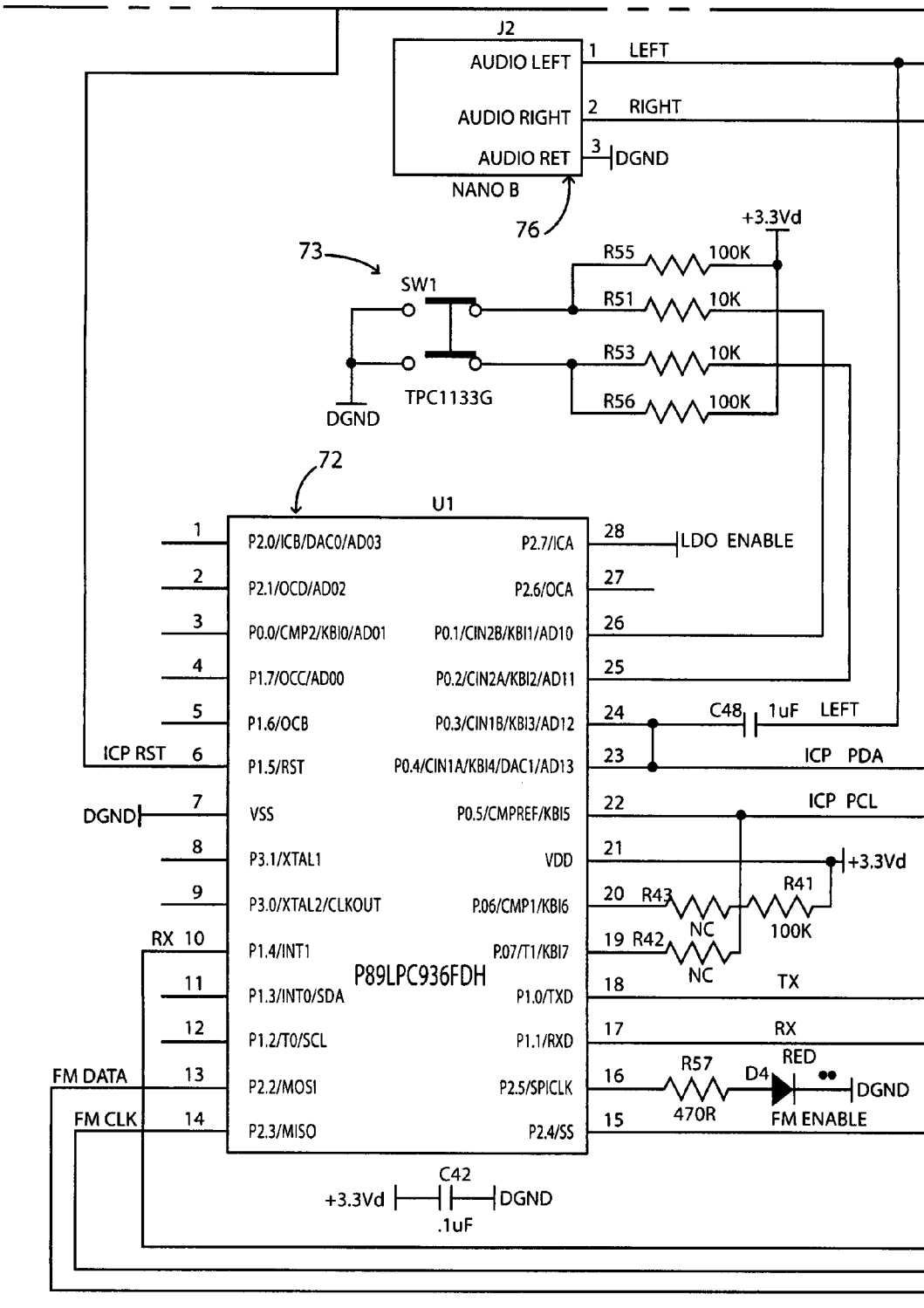
Figure 5D:
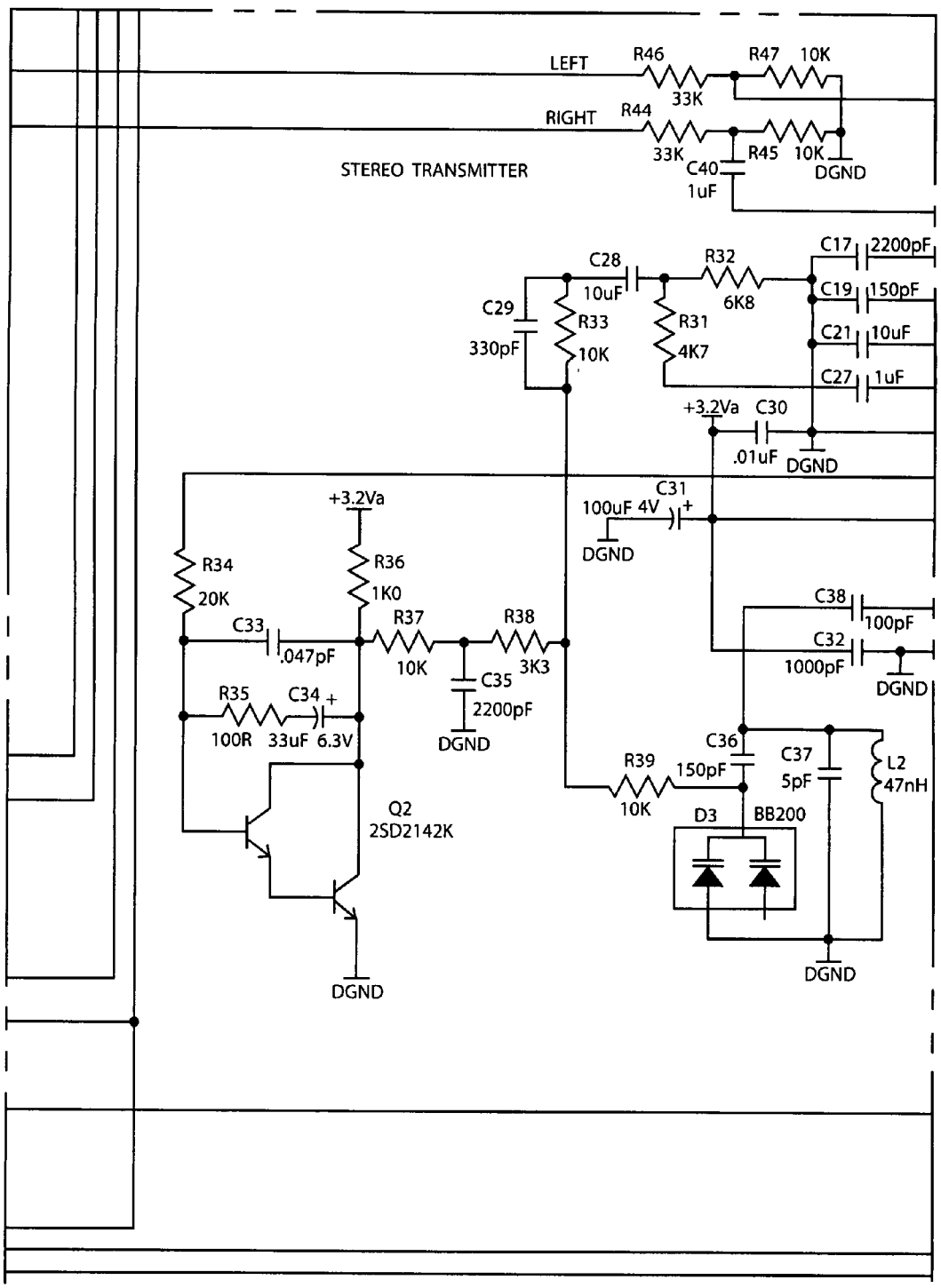
Figure 5E:
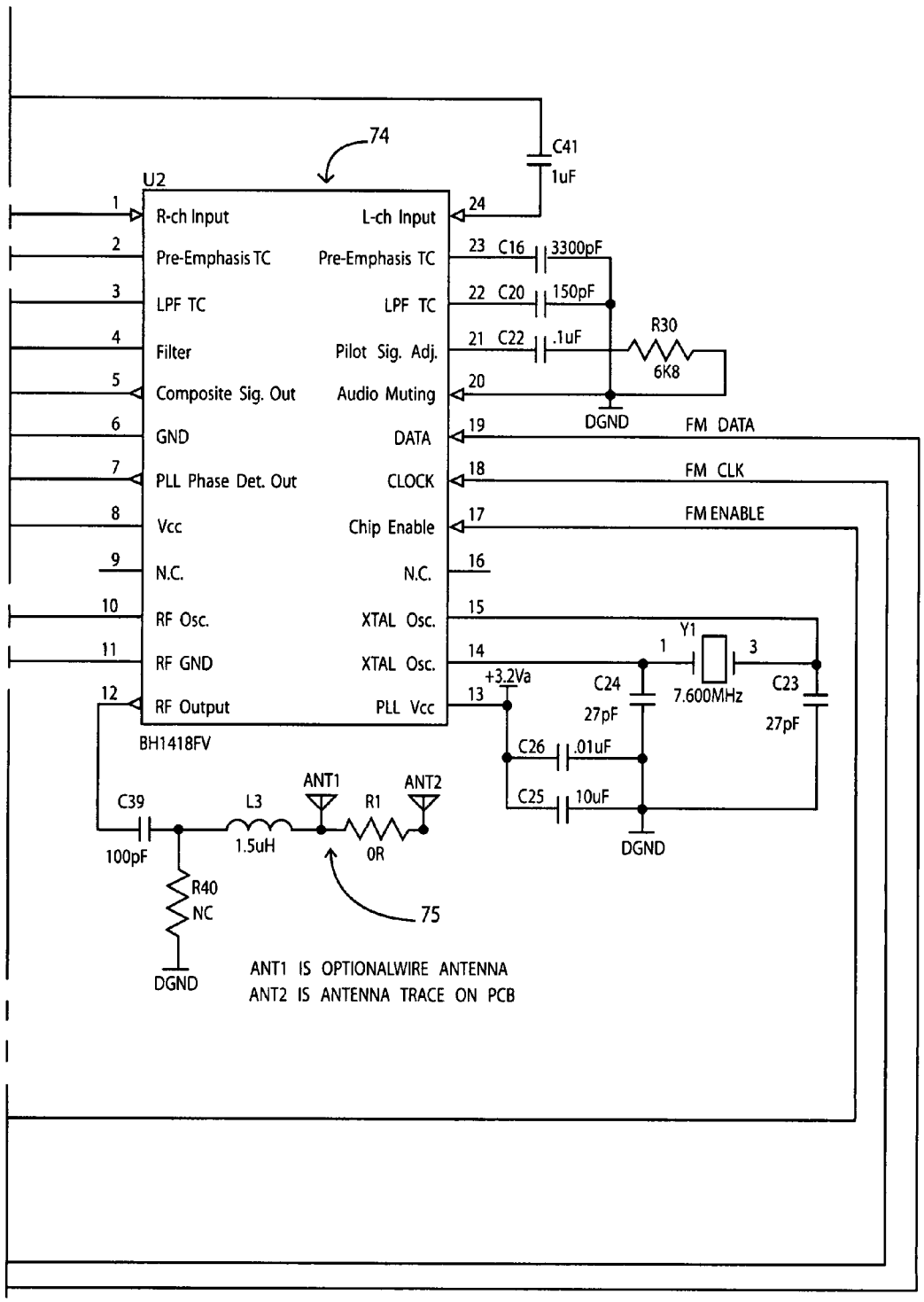

Referring now to FIG. 5, a schematic 70 of the electronics contained in an accessory constructed in accordance with an alternative embodiment of the present invention is shown. The primary electronics contained in the accessory are a microcontroller 72 and an FM transmitter 74. The accessory exchanges information, audio signals and power with the digital music player through a set of ports 76 and 78. These ports are also used to detect manipulation of the device's controls as described with respect to FIGS. 1 and 2. The particular accessory shown in FIG. 5 also has a USB port 71 that allows an external device to be coupled through the accessory to the USB port of the digital music player since the accessory covers the USB port of the digital music player. The microcontroller 72 receives and decodes user inputs received from a user input 73 such as the toggle switch shown and discussed with respect to FIGS. 3 and 4 or the device's controls as shown and discussed with respect to FIGS. 1 and 2. Depending upon the received inputs from the user input 73, the microcontroller 72 performs one of a number of functions. If the user input corresponds to the selecting of a transmission frequency for the FM transmitter 74, the microcontroller 72 compiles the appropriate codes and sends them to the FM transmitter 74 to instruct the transmitter to alter the frequency being transmitted from the antenna 75. In addition, the microcontroller 72 generates an image data file that is transmitted to the digital media player through a set of transmit pins in ports 78 used to couple the accessory to the digital music player. This image file is transmitted to the digital music player such that it is displayed on a screen of the digital music player as discussed in more detail herein.

The digital accessory is most preferably a parasitic device that takes its power from the digital music player. However, in alternate embodiments, the accessory could contain a battery for charging the digital music player or charging circuitry for producing a desired voltage for the digital music player. A power supply also may simply be coupled to the digital music player through the accessory if desired. The accessory is also preferably configured to allow the digital music player to be charged while it is coupled to the accessory. The accessory and device also preferably have verification or authorization chips that insure that the accessory is produced by the device's manufacturer or an authorized vendor of the device's manufacturer.

While the present invention is primarily discussed herein with respect to a transmitting accessory, many different functions can be provided and controlled in the above described manner. For example, the accessory can be configured to provide the device with a clock functionality that is controlled by repurposed keys on the device and uses the device's display to display the current time. Alternatively, the accessory can provide a Global Positioning System (GPS) function by sensing the GPS signals, determining a position and displaying the position on the display of the device. In such an embodiment, the GPS functionality may be controlled through repurposed keys on the display of the device as long as the device's software is capable of being accessed.

Another example of an accessory that can utilize the present invention is music player with a display that receives radio transmissions. The accessory provides an RDS data system for the music player that allows a user to receive and display RDS data related to the received music that the device is playing.

Yet another embodiment of the present invention provides a text message functionality to a digital media player by coupling the device to a text messaging, wi-fi or cellular network and displaying the received messages on the display of the device. A phone capability can also be provided on the accessory by including a microphone and speaker or utilizing the existing speaker of the media player to receive and send voice data. The internet enabled accessory can also be configured to receive webcasts and podcasts through the controls of the device and provide the digital content to the digital media player which displays the information.

Thus, although there have been described particular embodiments of the present invention of a new and useful IMPROVED DIGITAL MEDIA PLAYER ACCESSORY INTERFACE, it is not intended that such references be construed as limitations upon the scope of this invention except as set forth in the following claims.

What is claimed is:

1. An accessory for coupling with an electronic device having at least one device control user input for controlling a function of said device, said accessory comprising:
   an input port for receiving a digital device control signal indicative of a user's manipulation of said device control user input of said device; and
   conversion circuitry or software residing in said accessory for converting said digital device control signal into an accessory control input such that said device control user input can be used to control a function of said accessory that is different than a device function controlled by said device control user input;
   wherein said device control user input selects a set of regional preferences for a device FM receiver and said accessory implements a corresponding set of regional preferences for an accessory FM transmitter in response to said preferences selected with said device control user input.

2. The accessory of claim 1 wherein said device control user input controls a reception frequency of a receiver of said device and a transmission frequency of a transmitter in said accessory.

3. The accessory of claim 1 wherein said device control user input controls a mono or stereo reception mode of said device and a mono or stereo transmission mode of said accessory.

4. The accessory of claim 1 wherein said device is a media player, said accessory is a transmitter, said device control user input is a volume control for said media player and said conversion circuitry or software converts said volume control signal to a transmitter power output control signal.

5. The accessory of claim 1 wherein said accessory provides said device with a telephone functionality.

6. The accessory of claim 1 wherein the accessory is a parasitic device that obtains power from the electronic device.

7. The accessory of claim 1 wherein the accessory can display images on a display screen of the device.

8. An accessory for use with a digital media player without an FM transmitter wherein said digital media player includes a display screen and a set of user controls, said accessory comprising:
   repurposing circuitry residing in said accessory for detecting manipulation of at least some of said user controls through a connection to a digital output of said digital media player and producing control signals for an FM transmitter of said accessory based upon said detected manipulation of said user controls;
   wherein at least one of said user controls selects a set of regional preferences for a device FM receiver and said accessory implements a corresponding set of regional preferences for said FM transmitter in response to said preferences selected with said user control.

9. The accessory of claim 8 wherein said accessory comprises display circuitry or software for generating image files for display on said digital media player's display.

10. The accessory of claim 9 wherein said display circuitry generates a new image file for transmission to said digital music player when said user controls on said digital media player are manipulated.

11. The accessory of claim 8 wherein said digital media player is portable and said accessory receives power from a power supply of said portable digital media player.

12. The accessory of claim 8 further comprising a housing configured to physically couple to a housing of said digital media player.

13. A method of coupling an FM transmitting accessory to a digital output port of a portable electronic device without an FM transmitter, said method comprising:
   detecting manipulation of a device user input of said portable electronic device with said FM transmitting accessory;
   determining an operating parameter of said FM transmitting accessory that corresponds to said detected manipulation of said device user input; and
   altering said operating parameter of said FM transmitting accessory in response to said detected manipulation of said device's controls;
   wherein said device user input selects a regional preference for a device FM receiver and said FM transmitting accessory implements a corresponding regional preference for an accessory FM transmitter in response to said device user input.

14. The method of claim 13 further comprising generating an image corresponding to a menu having a number of user selections with said accessory, transferring said menu image to said portable electronic device, displaying said menu image on a display screen of said portable electronic device, and monitoring a user input on said portable electronic device to determine which of said user selections is selected by said user.

15. The method of claim 13 further comprising providing power from said portable electronic device to said accessory to power said accessory.

16. The method of claim 13 wherein said accessory is adapted to be physically and electrically coupled to said portable electronic device.

17. The method of claim 13 wherein said portable electronic device is a digital media player.

* * * * *